(12) United States Patent
Kawalkar

(10) Patent No.: US 9,776,510 B2
(45) Date of Patent: Oct. 3, 2017

(54) PRIMARY OBJECTIVE TASK DISPLAY METHODS AND SYSTEMS

(71) Applicant: HONEYWELL INTERNATIONAL INC., Morristown, NJ (US)

(72) Inventor: Amit Nishikant Kawalkar, Karnatake (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/721,381

(22) Filed: May 26, 2015

(65) Prior Publication Data

US 2016/0347176 A1    Dec. 1, 2016

(51) Int. Cl.
*G08B 23/00*     (2006.01)
*B60K 35/00*     (2006.01)
(Continued)

(52) U.S. Cl.
CPC ...... *B60K 35/00* (2013.01); *B60K 2350/1096* (2013.01); *G01C 23/00* (2013.01);
(Continued)

(58) Field of Classification Search
CPC ...... G08G 5/0021; G08G 5/045; G08G 5/025; G08G 5/0008; G08G 5/0091;
(Continued)

(56) References Cited

U.S. PATENT DOCUMENTS 6,002,347 A * 12/1999 Daly ............... G01S 13/91
                                                  340/945
6,700,482 B2 * 3/2004 Ververs ............ G01C 23/00
                                                  340/500
(Continued)

FOREIGN PATENT DOCUMENTS

CN         101807159 A      8/2010

OTHER PUBLICATIONS

Thales, Intelligent cockpit: support to anticipation | ASTUTE; [http://astute-project.eu/content/intelligent-cockpit-support-anticipation] 2011.

(Continued)

*Primary Examiner* — Joseph Feild
*Assistant Examiner* — Rufus Point
(74) *Attorney, Agent, or Firm* — Lorenz & Kopf, LLP

(57) ABSTRACT

Methods and systems are provided for adaptive display of information and interaction components on a display device of an aircraft. The method includes: receiving aircraft data from one or more aircraft components; determining context information from the aircraft data; determining a visual situation awareness indicator based on the context information; determining a situational awareness model based on the context information; determining a primary objective based on the situational awareness model; determining a task list based on the primary objective; determining situational awareness information based on a task of the task list; determining interactive components based on the task of the task list; and displaying the context information, the visual situation awareness indicator, the task list, the interactive components, and the situational awareness information on a user interface.

20 Claims, 4 Drawing Sheets

(51) Int. Cl.
| | |
|---|---|
| G01C 23/00 | (2006.01) |
| G08G 5/00 | (2006.01) |
| G08G 3/00 | (2006.01) |
| G08G 5/02 | (2006.01) |
| G08G 1/00 | (2006.01) |
| G08G 5/04 | (2006.01) |
| G08G 1/01 | (2006.01) |

(52) U.S. Cl.
CPC ............... *G08G 1/01* (2013.01); *G08G 1/20* (2013.01); *G08G 3/00* (2013.01); *G08G 5/003* (2013.01); *G08G 5/006* (2013.01); *G08G 5/0008* (2013.01); *G08G 5/0021* (2013.01); *G08G 5/0052* (2013.01); *G08G 5/0056* (2013.01); *G08G 5/0091* (2013.01); *G08G 5/025* (2013.01); *G08G 5/045* (2013.01)

(58) Field of Classification Search
CPC .... G08G 5/0052; G08G 5/003; G08G 5/0056; G08G 5/006; G08G 1/01; G08G 1/20; G08G 3/00; G08G 5/0034; G08G 5/0039; B60K 35/00; G01C 23/00; G01C 23/005
USPC .......................................................... 340/963
See application file for complete search history.

(56) References Cited

U.S. PATENT DOCUMENTS

| | | | |
|---|---|---|---|
| 8,483,889 B2 * | 7/2013 | Ishihara | G01C 23/005 340/945 |
| 8,527,133 B2 | 9/2013 | Guilley et al. | |
| 8,751,068 B2 | 6/2014 | Barraci et al. | |
| 8,788,128 B1 | 7/2014 | McCusker | |
| 8,831,793 B2 * | 9/2014 | Herman | F41H 3/00 701/1 |
| 8,838,294 B2 * | 9/2014 | Srivastav | G08G 5/0021 340/945 |
| 9,240,001 B2 * | 1/2016 | Herman | G06Q 10/10 |
| 9,567,099 B2 * | 2/2017 | Poux | G08G 5/0021 |
| 2002/0039070 A1 * | 4/2002 | Ververs | G01C 23/00 340/901 |
| 2012/0075123 A1 | 3/2012 | Keinrath et al. | |

OTHER PUBLICATIONS

Feigh, K. M. et al.; Toward a Characterization of Adaptive Systems : A Framework for Researchers and System Designers; Human Factors: The Journal of the Human Factors and Ergonomics Society 2012 54: 1008 originally published online May 1, 2012. The online version of this article can be found at: http://hfs.sagepub.com/content/54/6/1008.

Dorneich, M.C. et al.; The Crew Workload Manager: An Open-loop Adaptive System Design for Next Generation Flight Decks; Proceedings of the Human Factors and Ergonomics Society 55th Annual Meeting—2011.

Rong, J. et al.; Small Aircraft Pilot Assistant: Onboard Decision Support System for SATS Aircraft; AIAA 5th Aviation, Technology, Integration, and Operations Conference (ATIO) Sep. 26-28, 2005, Arlington, Virginia AIAA 2005-7382.

* cited by examiner

PRIMARY OBJECTIVE TASK DISPLAY METHODS AND SYSTEMS

TECHNICAL FIELD

The present disclosure generally relates to methods and systems for displaying information in an aircraft, and more particularly relates to methods and systems for determining, managing, and displaying flight deck information in an aircraft.

BACKGROUND

In existing integrated flight deck systems, information and interaction requirements are fragmented across various displays and systems within the aircraft. A pilot generally has to break down and interpret the fragmented information in order to determine a primary flight objective such as, for example, aviate, navigate, communicate, and manage (including safety and performance). From the primary flight objective, the pilot then determines system level information sets and interactive tasks that need to be retrieved and/or performed in order to achieve the flight objective. The cognitive process involved in deriving the tasks and task requirements is highly engaging and demands operational experience and conditioning of the pilot.

Hence, there is a need for improved systems and methods for interactively providing flight deck information to a pilot such that the cognitive demands on the pilot are reduced. Other desirable features and characteristics will become apparent from the subsequent detailed description and the appended claims, taken in conjunction with the accompanying drawings and the foregoing technical field and background.

BRIEF SUMMARY

Methods and systems are provided for displaying information on a display device of an aircraft. In one embodiment, a method includes: receiving aircraft data from one or more aircraft components; determining context information from the aircraft data; determining a visual situation awareness indicator based on the context information; determining a situational awareness model based on the context information; determining a primary objective based on the situational awareness model; determining a task list based on the primary objective; determining situational awareness information based on a task of the task list; determining interactive components based on the task of the task list; and displaying the context information, the visual situation awareness indicator, the task list, the interactive components, and the situational awareness information on a user interface.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
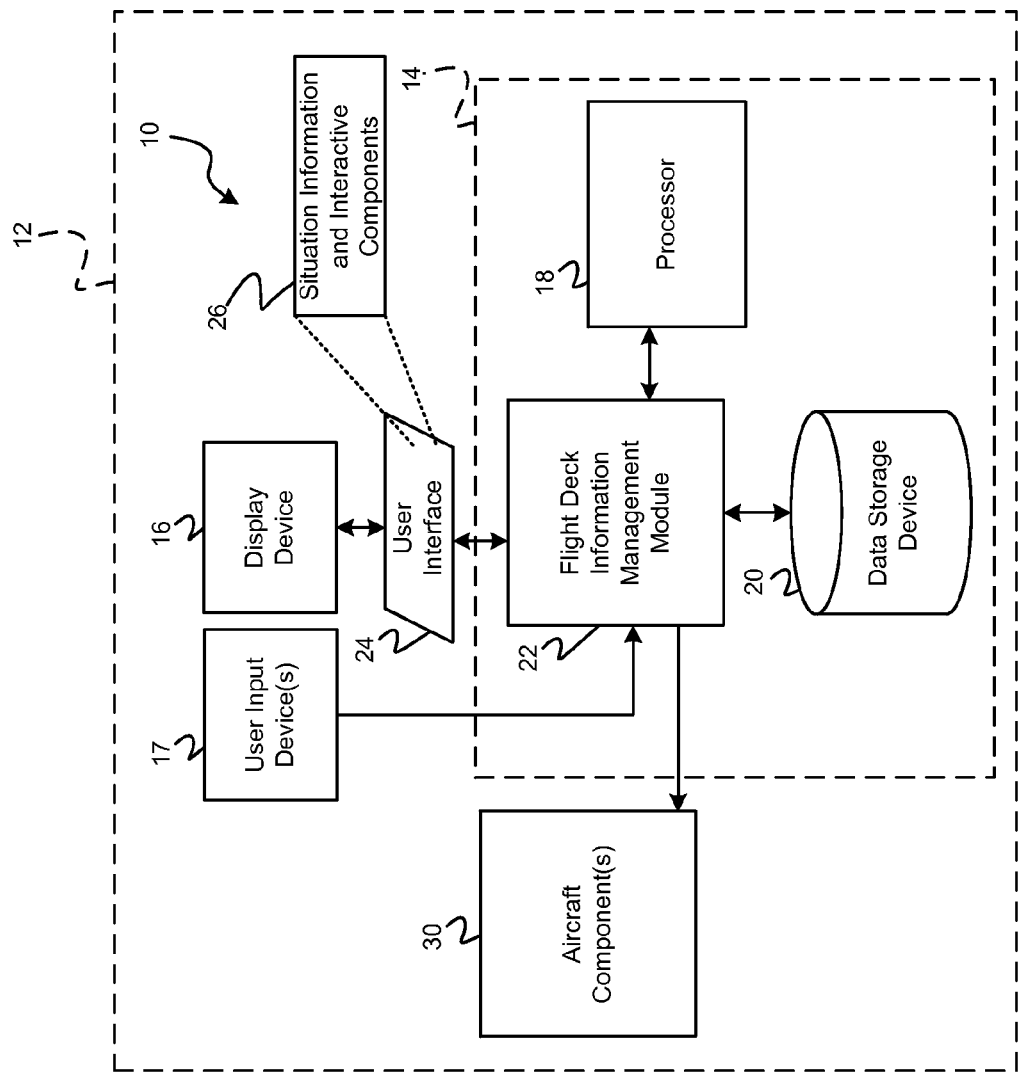
FIG. 1 is a functional block diagram illustrating flight deck information management system for an aircraft in accordance with exemplary embodiments.

Referring now to FIG. 1, exemplary embodiments of the present disclosure are directed to a flight deck information management system shown generally at 10 that is implemented on a computing device 14 that is associated with an aircraft 12. As can be appreciated, the flight deck information management system 10 described herein can be implemented in any aircraft 12 having onboard a computing device 14 and is not limited to any one example.

The computing device 14 is associated with a display device 16 and one or more user input devices 17. The display device 16 may be located in a cockpit of the aircraft 12 for viewing by, for example, a pilot of the aircraft 12. In various embodiments, the display device 16 is an interactive display device (e.g., a touch screen, or other interactive display device) that accepts user input from a user through the one or more user input devices 17.

The computing device 14 includes at least a processor 18, and one or more data storage devices 20. The processor 18 can be any custom made or commercially available processor, a central processing unit (CPU), an auxiliary processor among several processors associated with the computing device 14, a semiconductor based microprocessor (in the form of a microchip or chip set), a macroprocessor, or generally any device for executing instructions. The data storage device 20 stores instructions that can be performed by the processor 18. The instructions stored in the data storage device 20 may include one or more separate programs, each of which comprises an ordered listing of executable instructions for implementing logical functions.

The flight deck information management system 10 includes a flight deck information management module 22. The flight deck information management module 22 includes instructions that may be stored in the data storage device 20 and executed by the processor 18 of the computing device 14.

In general, the instructions of the flight deck information management module 22 manage an interactive user interface 24 that displays context sensitive situation awareness information 26 that may be used by a pilot or other aircraft operator to control the aircraft 12. The context sensitive situation awareness information 26 is determined and displayed with respect to a prevailing flight phase and/or flight segment, and a particular situation (e.g., normal, non-normal, emergency). The context sensitive situation awareness information 26 is presented in the user interface 24 in a manner to create a situation awareness visualization based on components of a represented situation.

Figure 2:
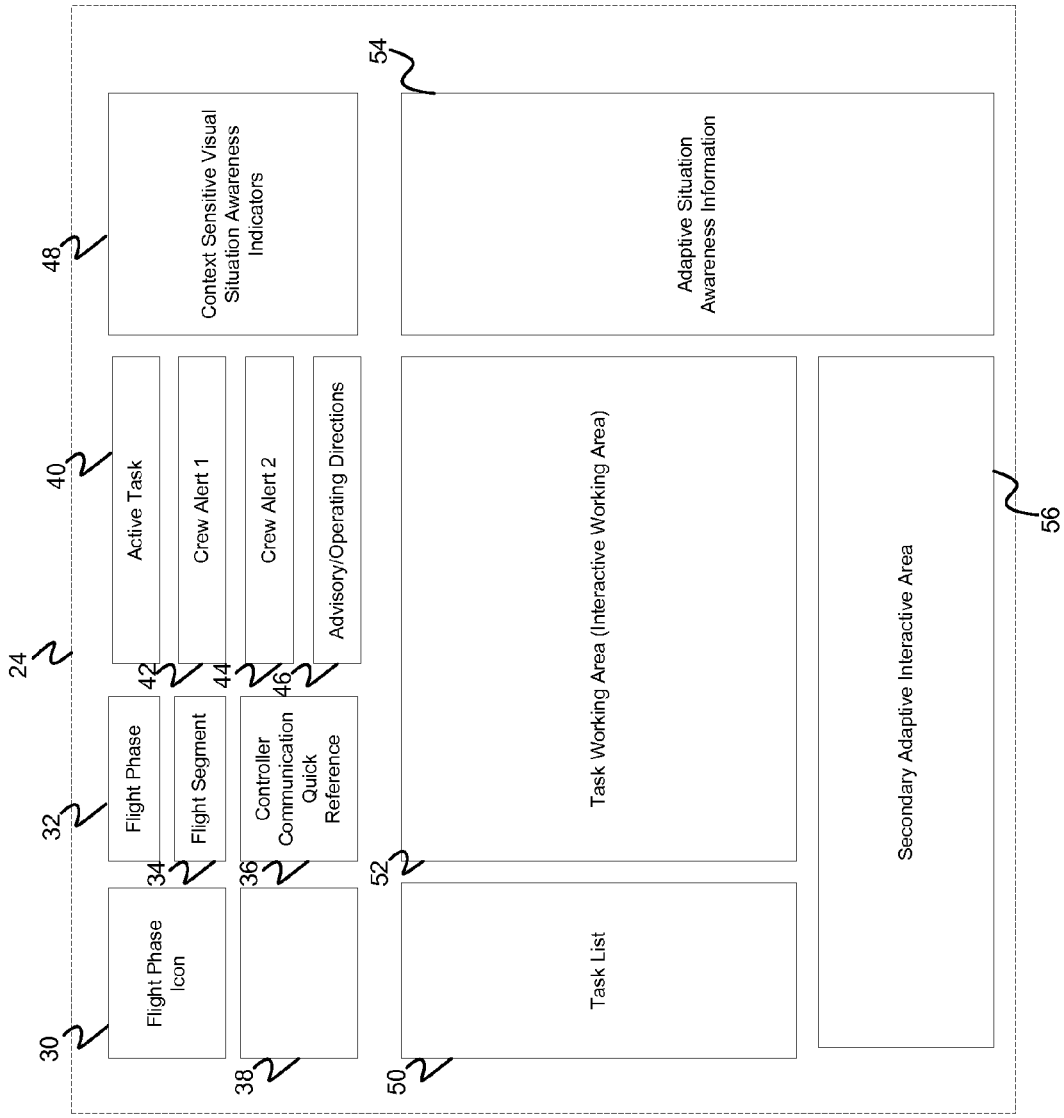
FIG. 2 is an illustration of a user interface that may be generated by a flight deck information management system and displayed on a display device of the aircraft in accordance with exemplary embodiments.

For example, as shown in FIG. 2, the interactive user interface 24 includes one or more dynamic information windows 30-56 that each display context sensitive situation awareness information in a graphical format and/or a textual format. In various embodiments, the dynamic information windows 30-56 include, but are not limited to, a flight phase icon window 30, a flight phase description window 32, a flight segment window 34, a controller message window 36, a controller message visualization window 38, an active task window 40, one or more alert windows 42-44, one or more advisory windows 46, a visual alert window 48, a task list window 50, a task visualization window 52, and one or more situation awareness interaction windows 54-56. As can be appreciated, the particular arrangement of the windows 30-56 in the user interface 24 can vary in various embodiments, as the disclosure is not limited to the present example.

In various embodiments, the windows 30-48 display information about the current context. The information is generally determined based on sensed or received information. For example, the flight phase icon window 30, in various embodiments, displays an icon or graphical element or symbol that is recognized as representing a prevailing flight phase (e.g., preflight, taxi, takeoff, etc.). For example, when the prevailing flight phase is determined by the flight deck information management module 22, a corresponding icon is selected and the flight phase icon window 30 displays the corresponding icon.

In various embodiments, the flight phase description window 32 displays a textual description of the prevailing flight phase (e.g., "Preflight," "Taxi," "Takeoff," etc.) once determined by the flight deck information management module 22. As will be discussed in more detail below, the prevailing flight phase is a factor in determining the high level objectives, related tasks, and situation awareness requirements. Thus, the flight deck information management module 22 updates one or more of the remaining windows based on the prevailing flight phase.

The flight segment window 34 displays a textual description of a prevailing flight segment. For example, once the prevailing flight phase is determined, the flight deck information management module 22 determines the flight segment under the prevailing flight phase and a textual description of the flight segment (e.g. for the "Takeoff" flight phase, the flight segments can include: "Line Up", "Takeoff Run", "Above 400 ft", etc.) is displayed. As will be discussed in more detail below, the prevailing flight segment is a factor in determining the high level objectives, related tasks, and situation awareness requirements. Thus, the flight deck information management module 22 updates one or more of the remaining windows based on the prevailing flight segment.

The controller message window 36 displays a textual description of controller messages or clearances for the current flight segment and situation. For example, the flight deck information management module 22 determines the controller messages or clearances from, for example, speech to text translated messages from the air traffic controller (ATC) or other sources. The textual description of the control messages or clearances (e.g., "Clear for Takeoff", "Runway Closed", "Climb to 5000", "Turn Right", and "Capture LUMA", etc.) are displayed in the controller message window 36. The controller message visualization window 38 displays an icon or graphical element that is recognized as representing the controller messages or clearance. For example, when the controller messages or clearances are determined by the flight deck information management module 22, a corresponding icon is selected and the controller message visualization window 38 displays the corresponding icon. For example, the visualizations can be 'RED/GREEN' to depict a controller's clearance status for an upcoming flight phase. In another example, the visualizations can be an image displaying arrows illustrating "Climb and Maintain 5000 ft". As can be appreciated, various other visualization techniques are contemplated within various embodiments as the disclosure is not limited to the present examples.

The active task window 40 displays a textual description of an active task being performed or that is recommended (e.g., "Before Taxi Checklist", "Weight and Balance", "De-Ice Boots Failure", "Multiple Failure", etc.) For example, the flight deck information management module 22 may determine the active task as a task assigned to the pilot, such as from an automatic checklist initiation, or as a pilot initiated task (e.g., via a pilot's selection of the task from the task list in the task list window 50).

The one or more alert windows 42-44 display a textual description of crew alerts. The alerts can be a combination of warnings and cautions and the flight deck information management module 22 selectively prioritizes the warnings and the cautions. For example, if there are five warnings and three cautions associated with the prevailing flight segment and/or active task, the flight deck information management module 22 selects the top two (or other number) priority warnings, and the top two warnings are displayed in the alert windows 42-44. In another example, if there is one warning and two cautions associated with the prevailing flight segment and/or active task, the flight deck information management module 22 selects the warning and a higher priority caution message, the warning and the caution message are displayed in the alert windows 42-22. As will be discussed in more detail below, the selected warnings and/or cautions are a factor in determining the high level objectives, related tasks, and situation awareness requirements. Thus, the flight deck information management module 22 determines and updates one or more of the remaining windows based on the selected warnings and/or cautions.

The advisory window 46 displays textual descriptions of advisories or instructions to the pilot (or other crew member). The advisories or instructions are determined based on the current situation, for example, as determined from the active task, the crew alerts, and/or based on a sensed parameters indicating a situation or a procedure branch. For example, in the event a "De-Ice boots Failure", is displayed as a crew alert, an instruction of "Avoid Low Power Setting" is determined as the appropriate instruction and displayed.

The visual alert window 48 displays multipurpose context sensitive visual alerts. The visual alerts are situation dependent. The visual alerts display parameters in which the pilot (or other operator) should be aware of. For example, the visual alerts can be generated for safety systems (e.g., EGPWS, CDTI, synoptic, AFCS modes etc.) or for situational notifications such as, but not limited to, cabin doors, transition altitude sequencing, altimeter settings, auto sequencing, radio frequency, and ground sequencing auto-sequencing.

The windows 50-56 display situational awareness information and interactive components. The information is generally determined based on the context information displayed in windows 30-48. For example, for each flight segment of a flight phase, there are one or more associated tasks to be performed. The flight deck information management module 22 determines the associated tasks for the flight segment and flight phase, determines an active task or a recommended task, and displays the situational awareness information and the interactive components based thereon.

In various embodiments, the task list window 50 lists various tasks relevant to the prevailing and predicted situations as determined from the context information. The flight deck information management module 22 derives the task list from situation awareness and interaction requirements associated with the current situation.

In various embodiments, the tasks in the task list can be associated with a state. The state can be based on the tasks relation to the current situation. For example, the states can include, but are not limited to, "active", "standby", and "predicted". An active task, for example, is a most relevant task for the current situation, and the pilot is not busy with any other task. An active task may be placed at the top of the task list and brought up by automatic selection. A standby task, for example, is a task that is not active but related to a current situation. For example, when a new task is created for a prevailing situation, and the pilot is busy with another active task, the new task is set to the standby state. In addition, when the pilot switches from an active task to a standby task, the state of active changes to standby and the selected standby task becomes the active task. A predicted task is a task that is based upon a situation episode (sequence of historic and prevailing situations) and is a task that is predicted to become relevant in an immediate future. For example, during a "De-ice boots Failure," "Rerouting and Diversion" is a task a pilot would perform only if the de-ice boots failed to recover during the procedure. However, while the procedure is in progress, a co-pilot can interact with a "Diversion" task to be more prepared and save diversion task effort when a de-ice boots system renders a failure. The pilot or other operator may initiate the predicted task if required at any point in time or the predicted task will naturally become a standby task if the task predictions are manifested The task visualization window 52 displays situation awareness information and interactive elements required to perform a selected task. For example, dynamic pages are created for each task. The dynamic pages include interactive components that are integrated across multiple flight deck systems. The dynamic pages include interaction and information objects. Some of the interaction objects may receive information (such as aircraft parameters) from the pilot or other operator.

The situation awareness interaction window 54 presents situation information related to a prevailing task or a standby task. For example, during pre-flight charts and maps, Minimum Equipment List (MEL), log book alerts, critical maintenance messages, automatic NOTAM and weather alert monitoring, etc. can be displayed.

The situation awareness interaction window 56 displays peripheral interactive objects related to active, as well as, standby tasks. In various embodiments, the visualization window 56 can be used as a multifunction display area, where objects (e.g., display snapshots, or other elements) can be dragged and dropped for quick reference.

With reference back to FIG. 1, a pilot or other aircraft operator may interact with the user interface 24 using the one or more input devices 17 to select a task or other interactive component and enter input. The flight deck information management module 22 then manages the user input received based on the operator's interaction with the user interface 24. The management of the user input, in some instances, causes one or more functions to be automatically performed by the aircraft 12. For example, the flight deck information management module 22 generates control messages and/or signals to aircraft components 30 to control one or more functions of the aircraft component.

Figure 3:
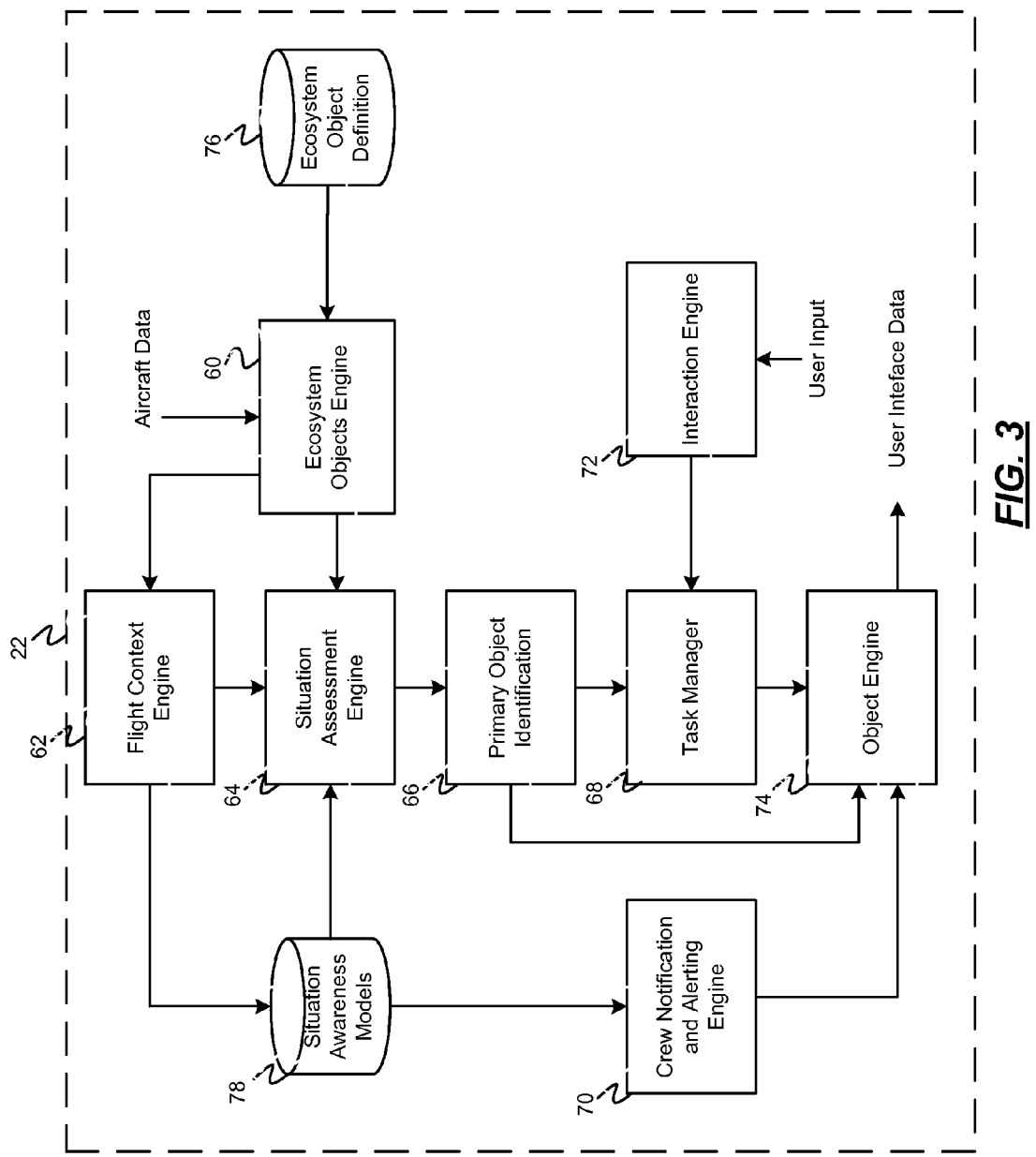
FIG. 3 is a functional block diagram illustrating a flight deck information management module of the flight deck information management system in accordance with exemplary embodiments.

With reference now to FIG. 3, the flight deck information management module 22 is illustrated in more detail in accordance with various embodiments. In various embodiments, the flight deck information management module 22 includes an ecosystem objects engine 60, a flight context engine 62, a situation assessment engine 64, a primary objective identifier 66, a task manager 68, a crew notification and alerting engine 70, an interaction engine 72, an object engine 74, and one or more datastores 76-78.

The ecosystem objects engine 60 senses aircraft operation ecosystem components' parameters (e.g., from an aircraft platform, controllers, a dispatcher, a weather system, surrounding aircrafts, etc.). The ecosystem objects engine 60 senses the parameters and creates ecosystem objects based on the sensed information using registered environment objects defined in an ecosystem object definition datastore 76. An exemplary subset of an ecosystem object model including ecosystem objects is illustrated in Table 1.

TABLE 1

| Object | Parameters | Source | Interface (Reference to Actual System Variable) |
|---|---|---|---|
| AirData | Airspeed | ADIRU | ADIRU.AirSpeed |
| | VeriticalSpeed | ADIRU | ADIRU.Vspeed |
| | LogitudinalAcceleration | ADIRU | ADIRU.LongitudinalAccl |
| | Headwind | ADIRU | ADIRU.HeadWind |
| Traffic | TrafficPosition | CDTI | CDTI.TrafficPosition |
| | RegionDensity | CDTI | CDTI.RegionDensity |
| NOTAM | ClosedRunways | DataLink | DataLink.CIRunway |
| | ClosedAirports | DataLink | DataLink.CIAirport |

The flight context engine 62 interprets the environmental objects and determines the context information including which flight phase, flight segment, non-normal, and emergency situation is prevailing. The flight context engine 62 performs a situation assessment to develop a situation assessment model about prevailing situations. In various embodiments, the situation assessment is performed based upon a defined state machine that defines flight phase and flight segments. Each state in the state machine has preconditions for that state to be relevant or valid. The flight context engine 62 periodically evaluates possible transitions based upon a determined current state. For example, if a current state is "Before Taxi", then conditions for a "Taxi" state are evaluated as a next anticipated state. In various other embodiments, the situation assessment can be performed using a General Intelligent System Architecture such as, but not limited to, ICARUS, MIDAS, or SOAR adaptations, or other methods.

The situation assessment engine 64 uses the developed situation assessment model to integrate and assess the relevant environmental objects and to derive conclusions about a prevailing situation(s). The situation assessment engine 64 generates nested situation descriptors for the prevailing situation. The situation descriptors are later converted into objects about the prevailing conditions and their participatory objects. The resultant situation assessment objects are used to create corresponding representative graphical objects to be displayed.

The primary objective identifier 66 uses the nested situation descriptors to determine one or more primary objectives for the situation. In various embodiments, this determination is based on standard operating procedures associated with a given scenario (e.g., as per OEM). An exemplary situation to objective mapping format is illustrated in Table 2.

TABLE 2

| Situation | Pilot Objective |
|---|---|
| DeparturePreparation | ROUTE_PLANNING |
|  | PREPARE_AIRCRAFT_FOR_DEPARTURE |
| Depart | TAXI_OUT |
|  | DEPART_AND_CAPTURE_ROUTE |

The task manager 68 maps identified primary objectives to a list of tasks involved in carrying out the objective. This component manages an entire life cycle of the tasks which includes task requirements identification, task creation, priority, and dynamic state management (e.g., active, standby and predicted). In various embodiments, the task requirement identification is implemented using static objective tasks that map cognitive task analysis as well as based on dynamic situations. Table 3 illustrates a task map for an objective of "Prepare Aircraft For Departure."

TABLE 3

| Flight Phase | Flight Segment | Primary Tasks | Predicted Tasks | Monitor |
|---|---|---|---|---|
| Preflight | PrePowerUp | ReviewLogBook | De-Ice (if icing) | |
|  |  | ReviewTripSheet |  | AOCMessages |
|  |  | ReviewWeather | ReviewAdvisory (if weather hazard) | CGPosition |
|  | DeparturePrep | ReviewNOTAM |  | NOTAM Alerts |
|  |  | ReviewDeparturePrams |  | Weather |
|  |  | InitializeDepartureParam | AskLongerRunwasy (If Heavy) | EngineParams |
|  | BeforeTaxi | RequestClearance |  | NOTAM |
|  |  | BeforeTaxiChecklist |  | IcingProcess |
| Preflight |  | DepartureBriefing |  | EngineParams and Systems |
| Preflight |  | ReviewNOTAM |  | NOTAM |
|  |  | ReviewWeather |  | WeatherHazard |

In various embodiments, the task manager 68 dynamically allocates objectives and/or tasks between a pilot and/or another operator. The allocation can be based on a defined model or an estimation of the pilot's and other operator's workload. In various embodiments, the task manager 68 may alternatively or additionally selectively assign objectives and/or tasks to the pilot or another operator based on user input.

The crew notification and alerting engine 70 determines the alerts (e.g., the warning, cautions, advisories, etc.) and notifications from the situation assessment model and the primary objectives. In various embodiments, the crew notification and alerting engine coordinates crew alert inputs from existing functionalities like FMS, Monitor Warning Function, EGPWS, etc. The crew notification and alerting engine 70 selectively prioritizes the warnings and/or cautions and presents the selected warnings and/or cautions to the object engine 74. In various embodiments, the crew notification and alerting engine 70 dynamically allocates alerts between a pilot and/or another operator. For example, a pilot may be allocated the warnings and a co-pilot may be allocated the cautions. In another example, the allocation can be based on a defined model or an estimation of the pilot's and other operator's workload.

The interaction engine 72 receives user inputs that are generated based on a pilot or other operator's interaction with the user interface 24. The interaction, for example, may be targeted to an object being displayed on the user interface 24, such as, but not limited to, checklists, tasks, dynamic page elements etc. The interaction engine 72 routes the input to the appropriate sub-system.

The object engine 74 dynamically creates objects to be displayed on the user interface 24 based upon output from the task manager 68, the primary objective identification 66, and the crew notification and alerting engine 70. These objects are updated in the user interface 24 either periodically or asynchronously based upon their object type. For example, all the objects are updated in a period of two seconds (or other value), and any objects associated with engine instrument readings are updated asynchronously as and when the values change.

Figure 4:
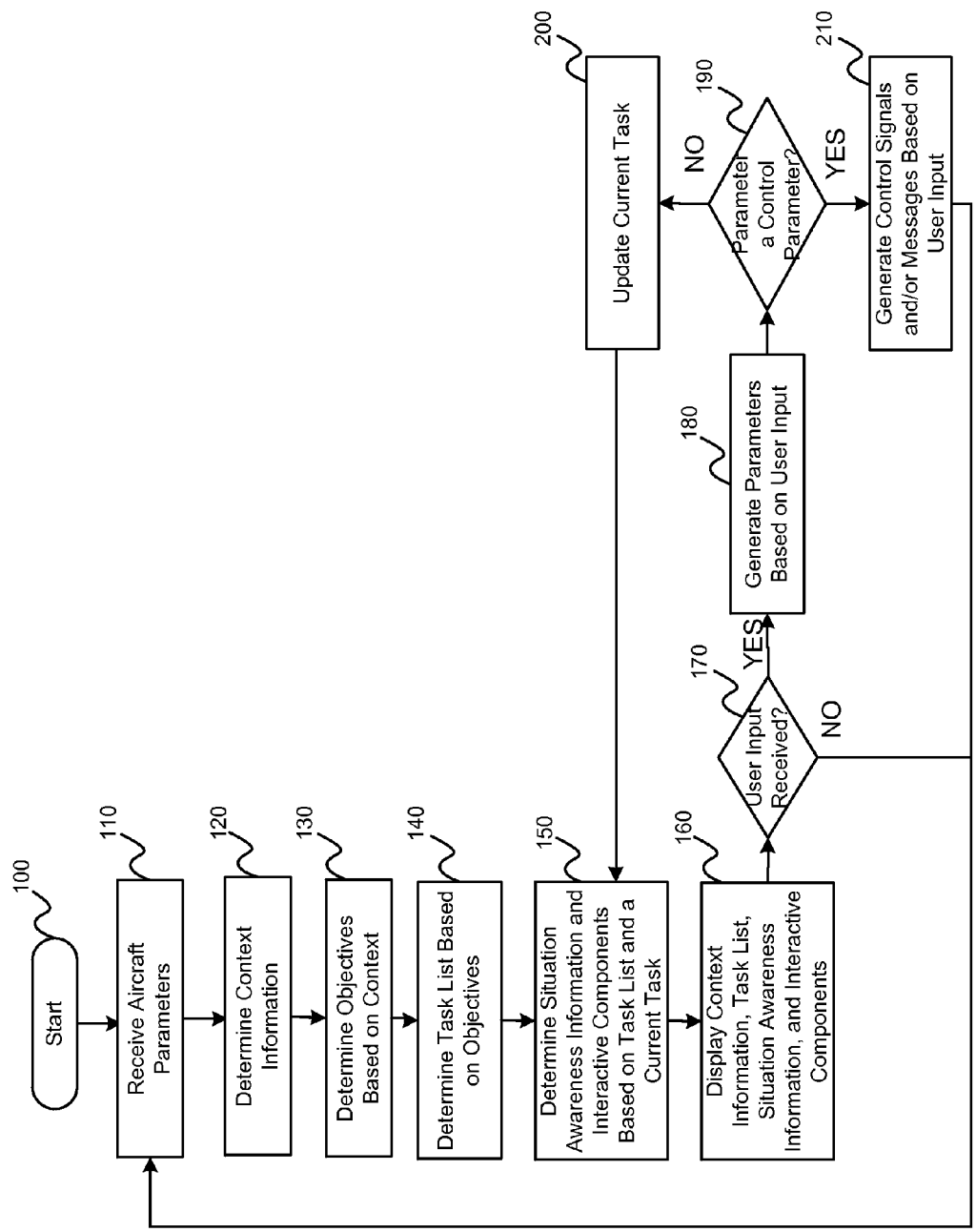
FIG. 4 is a flowchart illustrating flight deck information management method that may be performed by the flight deck information management system in accordance with exemplary embodiments.

Referring now to FIG. 4, and with continued reference to FIGS. 1 2, and 3, a flowchart illustrates a method that can be performed by the flight deck information management module 22 of FIG. 1 in accordance with the present disclosure. As can be appreciated in light of the disclosure, the order of operation within the method is not limited to the sequential execution as illustrated in FIG. 4, but may be performed in one or more varying orders as applicable and in accordance with the present disclosure.

In various embodiments, the method can be scheduled to run based on predetermined events or may be scheduled to run at predetermined time intervals. In one example, the method may begin at 100. Aircraft parameters are received from various aircraft control and information systems at 110 (and optionally updated in the user interface 24). The context information including the flight phase, the flight phase, the active task, crew alerts, and advisories are determined at 120. The primary objectives are determined based on the context information at 130. The task list is determined based on the primary objectives at 140. The situation awareness information and interactive components are determined based on the current task and the task list at 150. For example, the interactive components are integrated across various flight deck systems, and building at least one dynamic page based on the integrated interactive components. The context information, task list, situation awareness information, and interactive components are formatted into display objects and displayed in the user interface at 160.

Thereafter, it is determined whether user input is received at 170 (e.g., based on a user's interaction with an interactive component of the user interface 24). If a user input is not received at 170, the method returns to step 110 where new aircraft parameters are received and the context is updated.

If, however, user input is received at 170, user input parameters are generated based on the user input at 180. The parameters are evaluated at 190. If the parameters are meant to update a task or task feature on the display, the current task is updated at 200 and the method continues at step 150. If, however, the parameters are meant to control a feature of the aircraft 12, the control messages and/or control signals are generated based thereon at 210. Thereafter, the method continues at step 110 where the aircraft parameters are received and the context is updated. In various embodiments, the method may continue as long as the computing device 14 of the aircraft 12 is operational.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first", "second", "third", etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of displaying information on a display device from a flight deck management module of an aircraft, comprising:
receiving by the flight deck management module configured by a set of instructions to at least determine in a first instruction set: context information and a visual awareness indicator and in a second instruction set: a primary objective, situation awareness information and interactive components from across flight deck systems,
wherein the first instruction set comprises:
receiving aircraft data from one or more aircraft components,
determining context information from the aircraft data,
determining the visual situation awareness indicator based on the context information, and
the second instruction set comprises:
selecting the situational awareness model based on the context information and a state machine,
determining the primary objective based on the situational awareness model, determining a task list based on the primary objective,
determining situational awareness information based on a task of the task list, and
determining the interactive components based on the task of the task list; and
displaying in an integrated interface the context information, the visual situation awareness indicator, the task list, the interactive components, and the situational awareness information from across flight deck systems on a user interface.

2. The method of claim 1, wherein the context information comprises: a flight phase and a flight segment.

3. The method of claim 1, wherein the context information comprises: controller messages.

4. The method of claim 1, wherein the context information comprises: an active task.

5. The method of claim 4, wherein the context information comprises: an advisory message associated with the active task.

6. The method of claim 1, further comprising allocating tasks of the task list between a pilot and at least one other aircraft operator, and wherein the displaying comprises: displaying the allocating of tasks there between.

7. The method of claim 1, further comprising determining a plurality of alerts based on the context information, and wherein the displaying further comprises: selectively displaying the plurality of alerts.

8. The method of claim 7, further comprising prioritizing the plurality of alerts and wherein the selectively displaying is based on the prioritizing of the plurality of alerts.

9. The method of claim 8, further comprising allocating the plurality of alerts between a pilot and at least one other aircraft operator, and wherein the selectively displaying is further based on the allocating of the plurality of alerts there between.

10. The method of claim 1, further comprising managing a state of the tasks in the task list, and wherein the displaying further comprises: displaying the state of the tasks in the task list.

11. The method of claim 1, wherein the determining interactive components comprises: integrating interactive components across flight deck systems, and building at least one dynamic page based on the integrated interactive components.

12. The method of claim 1, wherein the displaying comprises: dynamically generating a situation awareness visualization based on components of a represented situation.

13. A system for displaying information on a display device of an aircraft, comprising:
a display device; and
a computer module that first receives aircraft data from one or more aircraft components, that second determines context information from the aircraft data from which determines a visual situation awareness indicator based on the context information, that third selects a situational awareness model based on the context information and a state machine, that fourth determines a primary objective based on the situational awareness model from which determines a task list based on the primary objective from which determines situational awareness information based on a task of the task list from which determines interactive components based on the task of the task list, and from which generates display objects to display in an integrated interface the context information, the visual situation awareness indicator, the task list, the interactive components, and the situational awareness information from across flight deck systems on a user interface of the display device.

14. The system of claim 13, wherein the context information comprises: at least one of flight phase, a flight segment, controller messages, and identification and display of an active task.

15. The system of claim 14, wherein the context information comprises: deriving and displaying an advisory message associated with the active task.

16. The system of claim 13, wherein the computer module comprises: allocating tasks of the task list between a pilot and at least one other aircraft operator, and generates display objects to display the allocation.

17. The system of claim 13, wherein the computer module comprises: determining a plurality of alerts based on the context information, prioritizing the plurality of alerts, allocating the plurality of alerts between a pilot and at least one other aircraft operator, and generating display objects to display the prioritizing and allocating of the plurality of alerts.

18. The system of claim 13, wherein the computer module comprises: managing a state of the tasks in the task list, and generating display objects to display the state of the tasks in the task list.

19. The system of claim 13, wherein the computer module comprises: determining the interactive components by integrating interactive components across the flight deck systems, and building at least one dynamic page based on the integrated interactive components.

20. The system of claim 13, wherein the computer module comprises: generating dynamically a situation awareness visualization based on components of a represented situation.

* * * * *